US012614962B1

(12) United States Patent
Murphy

(10) Patent No.: US 12,614,962 B1
(45) Date of Patent: Apr. 28, 2026

(54) MAGNETIC GEARS AND GEARING SYSTEM EMPLOYING MAGNETIC GEARS

(71) Applicant: Kevin Michael Murphy, Brooklyn, NY (US)

(72) Inventor: Kevin Michael Murphy, Brooklyn, NY (US)

(73) Assignee: Kevin Michael Murphy, Brooklyn, NY (US)

( * ) Notice: Subject to any disclaimer, the term of this patent is extended or adjusted under 35 U.S.C. 154(b) by 242 days.

(21) Appl. No.: 18/210,676

(22) Filed: Jun. 16, 2023

Related U.S. Application Data

(60) Provisional application No. 63/353,025, filed on Jun. 17, 2022.

(51) Int. Cl.
  *F16H 1/00* (2006.01)
  *H02K 49/10* (2006.01)
(52) U.S. Cl.
  CPC .................................. *H02K 49/102* (2013.01)
(58) Field of Classification Search
  CPC ........ H02K 49/00; H02K 49/02; H02K 49/06;
      H02K 49/10; H02K 49/102; H02K
      49/104; H02K 49/106; H02K 49/108;
      H02K 49/12; H02K 51/00; F16H 1/00;
      F16H 1/02; F16H 35/00; F16H 55/00;
      F16H 55/06; G09F 7/00; G09F 7/04
  See application file for complete search history.

(56) References Cited

U.S. PATENT DOCUMENTS

| | | | |
|---|---|---|---|
| 2,243,555 A * | 5/1941 | Faus ..................... | H02K 49/102 |
| | | | 74/460 |
| 2,548,373 A | 4/1951 | Hurvitz | |
| 5,013,949 A | 5/1991 | Mabe, Jr. | |
| 7,973,441 B2 | 7/2011 | Atallah | |
| 8,575,804 B2 | 11/2013 | Nakatsugawa et al. | |
| 9,337,712 B2 | 5/2016 | Storaasli | |
| 9,444,318 B2 | 9/2016 | Atallah et al. | |
| 10,090,749 B2 | 10/2018 | Kidd | |
| 10,224,798 B2 * | 3/2019 | Leas ..................... | H02K 49/102 |
| 10,541,597 B2 | 1/2020 | Whitfield et al. | |
| 2011/0127869 A1 | 6/2011 | Atallah et al. | |

FOREIGN PATENT DOCUMENTS

| | | | | |
|---|---|---|---|---|
| CN | 201714909 U * | 1/2011 | ............... | F16H 1/02 |
| DE | 4400874 A1 | 9/1994 | | |
| DE | 102012001880 A1 | 8/2013 | | |

(Continued)

OTHER PUBLICATIONS

Scheidler et al., "NASA's Magnetic Gearing Research for Electrified Aircraft Propulsion," NASA Glenn Research Center, Jul. 12, 2018, pp. 12.

(Continued)

*Primary Examiner* — Tran N Nguyen
(74) *Attorney, Agent, or Firm* — Gearhart Law LLC

(57) ABSTRACT

Described herein are gears having magnetic properties with strategic positioning of the magnetic portion(s) of the gears. This allows for multiple gears to be used in a gearing system without the need for the gears to touch thereby eliminating the need for lubricants and limiting wear on the gears in the system while also reducing heat generated by the system and the need for additional cooling systems.

17 Claims, 8 Drawing Sheets

(56)                    References Cited

FOREIGN PATENT DOCUMENTS

| | | | | | |
|---|---|---|---|---|---|
| DE | 112015006105 | A5 | 11/2017 | | |
| EP | 1069671 | A1 | 1/2001 | | |
| EP | 2575244 | A1 | 4/2013 | | |
| EP | 2874293 | A1 | 5/2015 | | |
| EP | 2660440 | B1 | 11/2019 | | |
| JP | H02102947 | A | 4/1990 | | |
| KR | 200369033 | Y1 * | 12/2004 | ............. | F16H 13/12 |
| WO | 2021169138 | A1 | 9/2021 | | |

OTHER PUBLICATIONS

Justin J. Scheidler, "Progress in Magnetic Gearing for Aeronautics and Space Applications," NASA Glenn Research Center, Sep. 12, 2023, pp. 21.
Tallerico et al., "Magnetic Gears and Their Structural Limitations," Nasa Glenn Research Center, Sep. 9, 2019, pp. 26.
Perez-Diaz et al., "Magnetic Gearboxes for Aerospace Applications," 42nd Aerospace Mechanism Symposium, May 14, 2014, pp. 10.

* cited by examiner

MAGNETIC GEARS AND GEARING SYSTEM EMPLOYING MAGNETIC GEARS

CROSS-REFERENCE TO RELATED APPLICATIONS

This application claims priority to U.S. Application Ser. No. 63/353,025, filed on Jun. 17, 2022, the entire contents of which are herein fully incorporated by reference in its entirety.

FIELD OF THE EMBODIMENTS

The field of the present invention and its embodiments relate to gears having magnetic properties and systems employing those gears. In particular, the present application relates to magnetic gears having strategically positioned magnetic elements to allow for non-traditional gearing configurations and uses to be realized.

BACKGROUND OF THE EMBODIMENTS

Gears have been used in mechanical devices for centuries. The origin of gears can be traced back to early China. Gears and gear systems can be used in many diverse types of mechanical devices and for many different purposes. For example, gears can be used in vehicle transmissions, wind turbines, elevators, clocks, helicopters, and the like.

Many geared systems function by having at least one rotating member for engagement with another member. The problem with such physical contact (engagement) is that there is often the problem of jamming of the gears, loss of lubrication, deleterious particles, and matter getting in between the gears, and the wearing down of the gears and other system components by friction. There are also situations where the angles of rotation of the gears with respect to each other must change during operation. In order to overcome these issues, magnetic gears and gear systems have been created. These gear systems are generally contactless and frictionless. Therefore, magnetic gears and gear systems lose less energy and experience less stress than traditional gears and gear systems.

As noted herein, there have been attempts to create various magnetic gearing systems. Some of which disclose magnetic gear systems in which the magnets are positioned such that one pole is on the outside of a singular gear. This means that the gear has either an all north or an all south polarity. The other gear in the system will either have the same or opposite polarity on the outside of the gear, depending on if the gear system uses attraction or repulsion. Yet other magnetic gearing systems use an alternating polarity structure.

However, the known magnetic gearing systems incorporate magnet arrangements that fail to optimize the magnetic fields and potential energy of the magnets. Accordingly, what is needed is a magnetic gear system that has a magnet arrangement that maximizes the use of the magnetic fields and potential energy of the magnets to aid the transfer of energy through the magnetic gear system.

This is achieved by using magnetic gears and systems employing the same having a reduction in friction, a reduction in heat generated, a quieter operation of a gearing system that lacks physical contact between the gears, and the lack of lubricants or other materials required to keep the system working at an optimal pace.

Review of Related Technology

U.S. Pat. No. 10,090,749 pertains to a magnetic gear system. The magnetic gear system incorporating magnetic gears includes at least one end plate and at least one axle coupled to the at least one end plate. A plurality of magnet holders are also coupled to the at least one end plate. At least one magnet is contained in each of the plurality of magnet holders. Wherein the at least one magnet comprises two opposite polarities and the plurality of magnet holders are coupled to the at least one end plate with the at least one magnet having at least one polarity adjacent a similar polarity of another of the at least one magnet.

U.S. Patent Application Publication 2017/0271970 pertains to a magnetic gear system that includes magnetic gearboxes where one of a driving gear and a driven gear are in sequential magnetic linkage, and one of the magnetic gears can be tilted relative to the other gear wherein the magnetic gears are prevented from overlapping each other to prevent loss of sequential magnetic interaction. A magnetic gearbox is also disclosed where a driving gear can be tilted relative to a driven gear to change the torque, the rotational speed of the driven gear, and if tilted far enough, to change the direction of rotation of the driven gear. Another magnetic gearbox includes a pair of magnetic gears that can be manipulated to result in a reversal of the direction of rotation of a driven gear from a driving gear without changing the magnetic properties of either gear. A gearbox is also described that includes a magnetic gear irrotationally mounted on one shaft and a set of gears on another shaft, wherein the one gear is in sequential magnetic interaction with the set of gears to alter the rotational speed of either the one gear or the set of gears. A pair of magnetically linked magnetic gears is described as having equal diameters but unequal numbers of magnetic gears.

International Application Publication WO2021/169138 pertains to a disc-type permanent-magnet gear and a disc-type permanent-magnet gear-based transmission structure. The disc-type permanent-magnet gear comprises a gear base disc, a transmission shaft that penetrates the middle of the gear base disc, and a plurality of permanent magnets embedded in the gear base disc. The permanent magnets are distributed along the circumference of the gear base at uniform intervals; magnetic poles of all the permanent magnets are exposed on at least one side round surface of the gear base, and all the magnetic poles of the permanent magnets exposed on the same side surface of the gear base have the same polarity. The disc-type permanent-magnet gear achieves transmission torque by only using one group of permanent magnets having the same arrangement direction of magnetic poles on existing permanent-magnet gears; at the same time, the disc permanent-magnet gear achieves transmission by means of a repulsion force between magnetic poles having the same polarity, which increases the magnetic transmission force, reduces changes to the magnetic field as a result of changes to the magnetic poles during rotation, and prevents the occurrence of sudden vibration in transmission.

European Patent Application Publication 1069671 pertains to a magnetic gear train comprising two or more members rotatable about a corresponding axis, each axis being equipped with a plurality of magnets circumferentially spaced along their periphery and projecting therefrom. The magnetic axes of the permanent magnets are in planes perpendicular to the axes of rotation, and are further inclined to the radial direction of the corresponding rotatable member.

Thus, there is a need for magnetic gears and a system employing said magnetic gears to provide enhanced gearing systems that create less wear on the gears and allow for non-traditional gearing relationships. The present invention and its embodiments meet and exceed these needs.

SUMMARY OF THE EMBODIMENTS

In general, the present application and its embodiments relate to magnetic gears and a system employing multiple magnetic gears as described herein. The magnetic gears allow for an alternating polarity of a plurality of magnets to be disposed along a periphery of a gear body. Magnets are preferably located at each vertex of the gear body with each gear body having about four to twenty vertices. Between the vertices is located another magnet that is biased (located closer) towards one of the two vertices it is positioned between. Such a relationship allows for a gearing system employing the magnetic gears of the present application to have superior performance and characteristics over known magnetic gear systems. Further, the magnetic gearing systems employing gears of the present application can be used to create arrays of gears in differing planes without loss of efficiencies.

In one aspect of the present application, there is a magnetic gear having a plurality of magnets, a magnet retaining structure configured to secure a position of each of the plurality of magnets relative to the magnet retaining structure, where the magnet retaining structure includes a body having a periphery, where one magnet of the plurality of magnets is positioned at each vertex of the body and one magnet of the plurality of magnets is positioned between the magnets located at each vertex, and where the magnet located between the magnets located at each vertex is biased toward one vertex.

The magnetic gear may also include a central aperture located in the body.

The magnetic gear may also include where the body has at least three vertices.

The magnetic gear may also include where the body includes a first body and a second body.

The magnetic gear may also include where the plurality of magnets are configured to reside between the first body and the second body.

The magnetic gear may also include where a polarity of the plurality of magnets is arranged in an alternating fashion.

The magnetic gear may also include where the magnet located between magnets at the vertices splits the difference between the magnets at about a 40:60 split.

In yet another aspect of the present application, there is a magnetic gear having a plurality of magnets, a magnet retaining structure configured to secure a position of each of the plurality of magnets between a first body and a second body, where the first body and the second body have a substantially identical periphery and are configured to be secured to one another, where the plurality of magnets are disposed along a periphery of the first body with a polarity of each magnet being of an opposing polarity in relation to the magnet on either side of the magnet, where a magnet of the plurality of magnets is positioned at each vertex of the periphery and one magnet of the plurality of magnets is positioned between the magnet located at each vertex, and where the one magnet located between the magnet located at each vertex splits a distance between two vertices in about a 40:60 split.

The magnetic gear may also include where the magnetic gear is a quadrilateral.

The magnetic gear may also include where the magnetic gear is a hexagon.

The magnetic gear may also include where more than one magnet is located at a position on the magnetic gear.

The magnetic gear may also include a plurality of securement mechanisms configured to secure the first body to the second body.

In yet another aspect of the present application, there is a magnetic gear system having a first magnetic gear that includes a plurality of magnets, a magnet retaining structure configured to secure a position of each of the plurality of magnets relative to the magnet retaining structure, where the magnet retaining structure includes a body having a periphery, where one magnet of the plurality of magnets is positioned at each vertex of the body and one magnet of the plurality of magnets is positioned between the magnets located at each vertex, and where the magnet located between the magnets located at each vertex is biased toward one vertex. The magnetic gear system also includes a second magnetic gear having a plurality of magnets, a magnet retaining structure configured to secure a position of each of the plurality of magnets relative to the magnet retaining structure, where the magnet retaining structure includes a body having a periphery, where one magnet of the plurality of magnets is positioned at each vertex of the body and one magnet of the plurality of magnets is positioned between the magnets located at each vertex, and where the magnet located between the magnets located at each vertex is biased toward one vertex.

The magnetic gear system may also include a third magnetic gear having a plurality of magnets, a magnet retaining structure configured to secure a position of each of the plurality of magnets relative to the magnet retaining structure, where the magnet retaining structure includes a body having a periphery, where one magnet of the plurality of magnets is positioned at each vertex of the body and one magnet of the plurality of magnets is positioned between the magnets located at each vertex, and where the magnet located between the magnets located at each vertex is biased toward one vertex.

The magnetic gear may also include where the body has anywhere from four to twenty vertices.

The magnetic gear may also include where the quadrilateral is a square.

The magnetic gear may also include where the hexagon-shaped magnetic gear contains twelve magnets.

The magnetic gear system may also include where the first magnetic gear, the second magnetic gear, and the third magnetic gear are oriented to cause magnets of the same polarity to repel one another when the first magnetic gear, the second magnetic gear, and the third magnetic gear are rotated about a central axis.

The magnetic gear system may also include where the first magnetic gear, the second magnetic gear, and the third magnetic gear are oriented parallel to one another in differing planes.

The magnetic gear system may also include where the first magnetic gear, the second magnetic gear, and the third magnetic gear are oriented in differing horizontal and vertical planes.

The present application and its embodiments allow for as many additional gears as needed to be added into the total system.

The present application and its embodiments allow for the transfer of torque applied to a magnetic gear which then, by the work of magnetic fields, and no physical contact, transfers the torque to another magnetic gear.

The present application and its embodiments allow for a sleek, minimalist, and fixed design that features openings to allow for different attachment parts to be added to the magnetic gear.

The present application and its embodiments allow for an array of the present application to be scaled to any symmetrical size in the X and Y plane, as long as the ratio of its parts and magnet spacing remains the same.

The present application and its embodiments allow for magnetic gears to be aligned vertically along the central axis, and by way of magnetic coupling and not physical contact, the like-poles will attract, creating a uniform motion in a specific direction.

Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

FIG. 8 illustrates a second embodiment of an exemplary magnetic array.

DETAILED DESCRIPTION OF THE EMBODIMENTS

Figure 1:
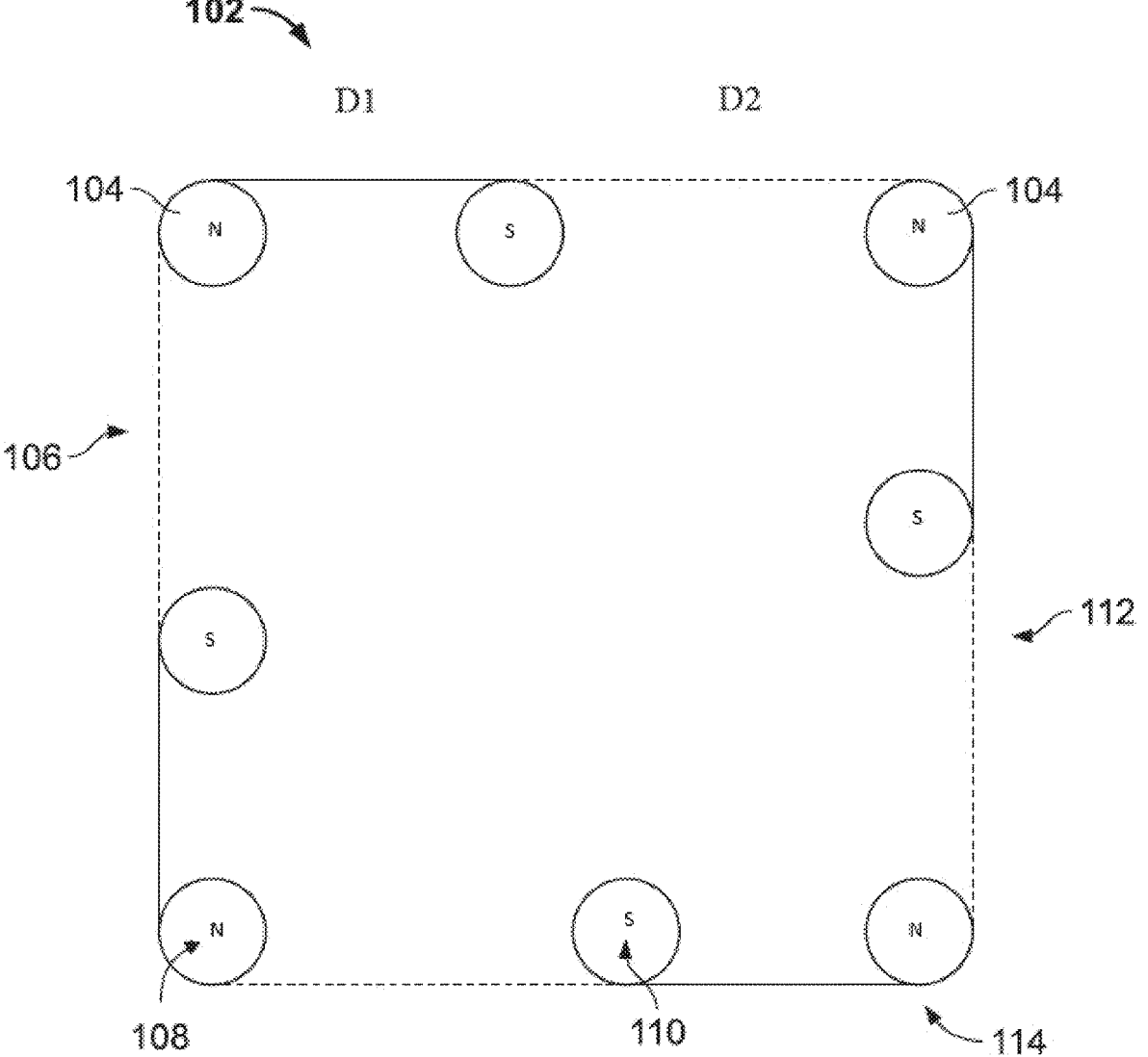
FIG. 1 illustrates an embodiment of a magnetic gear in accordance with the present application.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As used herein, the term "about" is meant to signify the variable specified+10%. Thus, if the specified variable is a 40:60 ratio then the term "about" would cover a range of 30:70 to 50:50.

Referring now to FIG. 1, there is a first embodiment of a magnetic gear 102 having a plurality of magnets 104, a gear body 106, a positive polarity 108, a negative polarity 110, a periphery 112, and a vertex 114.

Figure 2:
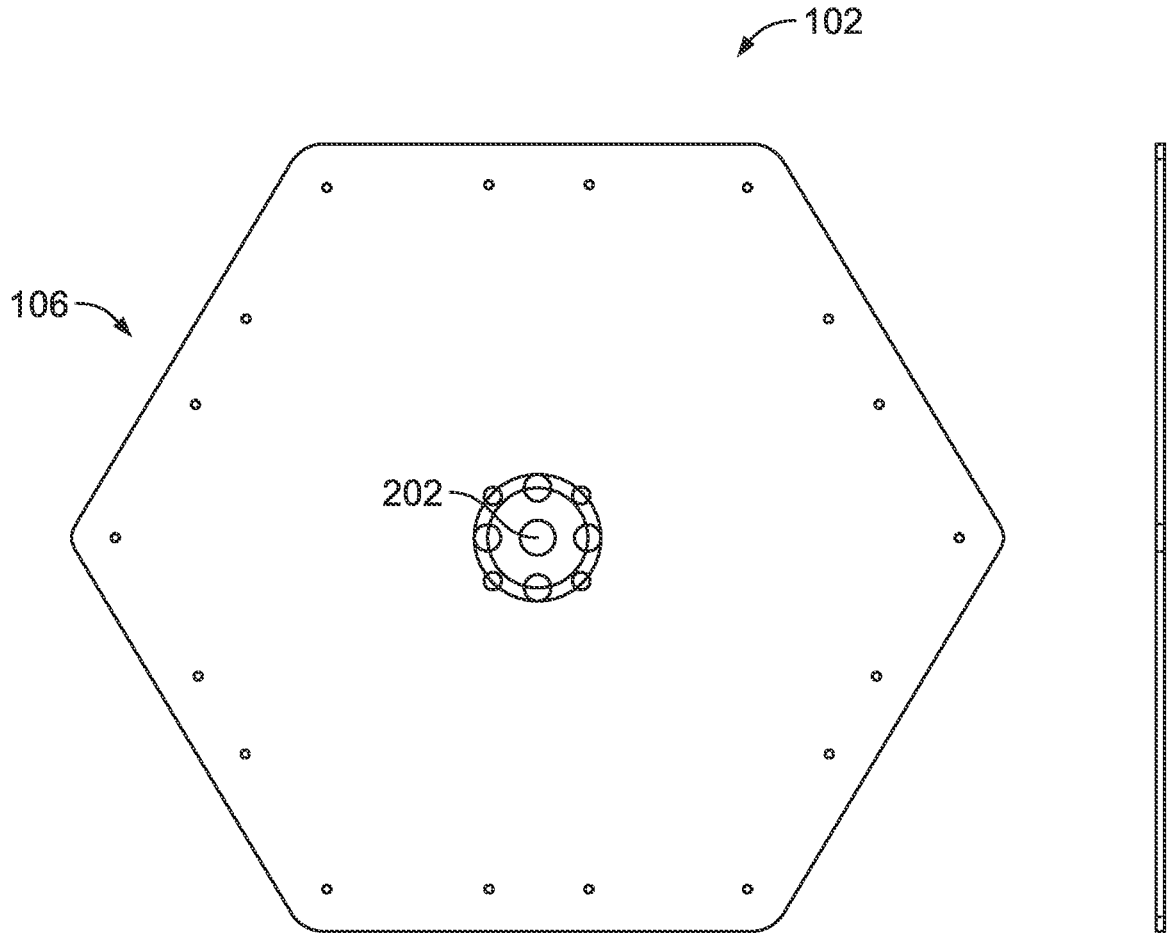
FIG. 2 illustrates a second embodiment of a magnetic gear in accordance with the present application.

The magnetic gear 102 of the present application utilizes both magnetic repulsion and attraction simultaneously, when interacting with one or more additional magnetic gears 102, to create angular momentum around a central axis (see FIG. 2). With a plurality of magnets 104 disposed on each magnetic gear 102, an individual magnetic gear 102 can spin in either clockwise or counter-clockwise direction. At any one moment, two positive (+) magnetic poles are configured to repel each other, while a third negative (−) magnetic pole (located between the two positive magnetic poles) attracts the others, on a second magnetic gear (see FIGS. 6-8), to guide their spin, limiting and/or preventing any recoil from said magnetic interaction. Whether the positive pole magnet of the two is trailing the other, in the established spin direction, is the magnet that is pushing the other forward, known as the "trailing magnet." As the trailing magnet repels the first magnet forward, known as the "lead magnet", a third negative magnetic pole, known as the "guide magnet", situated in sequence next to the positive pole lead magnet, attracts the trailing magnet, guiding the trailing magnet forward. This guide magnet helps the trailing magnet to continue to propel the lead magnet forward so it can then repel a new, fourth, positive magnet pole forward. The lead magnet becomes the trailing magnet in the subsequent connection. Simultaneously, the original trailing magnet will become a lead magnet in its next interaction brought on by the next positive magnetic pole in sequence, which is guided by the next negative pole magnet in sequence situated next to the positive pole lead magnet, formally known as the trailing magnet in the previous connection.

The gear body 106 may be formed from any suitable material that is non-reactive (non-magnetic) with the plurality of magnets 104 disposed therein. Preferred materials include polymers such as but not limited to polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or any combination thereof. Other materials such as composites and certain metals may also be used. Composites may include but are not limited to fiber-reinforced plastics, metal composites, carbon fiber, Kevlar® and the like. Metals may comprise lightweight metals such as aluminum and other pure metals as well as various alloys.

The plurality of magnets 104 are preferably rare earth magnets such as neodymium or samarium cobalt magnets. Other types of permanent magnets such as composite magnets, nano-structured magnets, electromagnets, and single-molecule magnets. Advantageously, electromagnets may be turned "on" or "off" by the application of an electric current. Further, the amount of electric current supplied can further modify the magnetic field generated by such a magnet or group of magnets.

As shown in FIG. 1, the plurality of magnets 104 are spaced around a periphery 112 of the gear body 106. The magnets having a positive polarity 108 are located in the vertices 114 and the magnets having a negative polarity 110 are located in between two magnets having a positive polarity 108 on the vertices 114. In other embodiments, the negative polarity 110 magnets may be in the position of the positive polarity 108 magnets as shown in FIG. 1.

However, the magnet having a negative polarity 110 (or positive polarity 108 depending on the configuration) is not situated equidistant from the two other magnets it is positioned between. D1 and D2 represent the distances from the magnet having a negative polarity 110 to each of the respective vertices 114. D1 is equal to about 40% of the total distance from vertex 114 to vertex 114, whereas D2 is equal to about 60% of the distance from vertex 114 to vertex 114. For example, if the length from vertex 114 to vertex 114 as shown in FIG. 1 is three (3) inches, then the middle magnet or magnet having a negative polarity 110 is located D1 (1.25 inches) from one vertex, and D2 (1.75 inches) from the other vertex.

Figure 3:
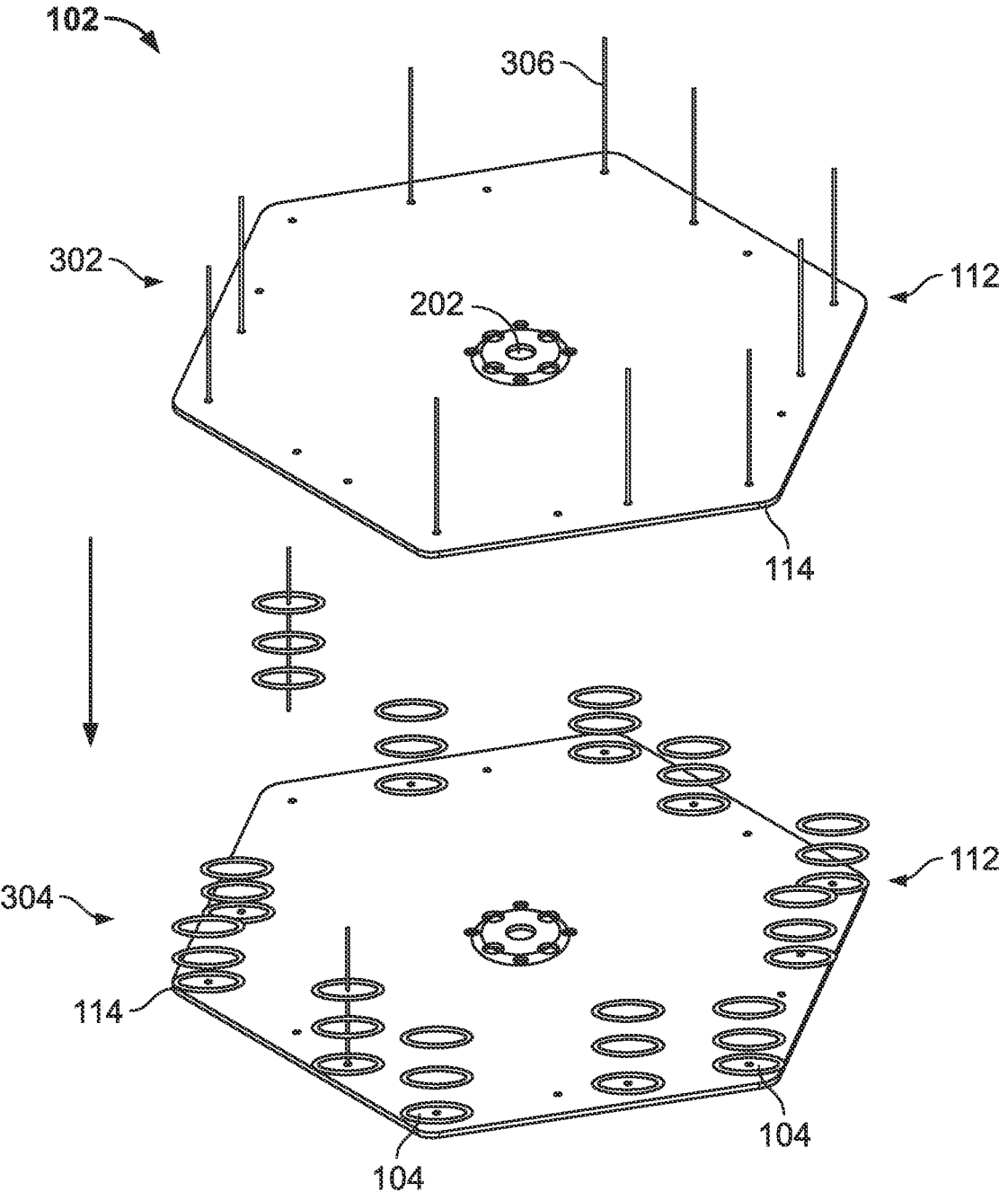
FIG. 3 illustrates a third embodiment of a magnetic gear in accordance with the present application.

Referring now to FIGS. 2 and 3, there is another embodiment of a magnetic gear 102. Here, the gear body 106 is hexagonal in shape. Further, there is a central aperture 202 to allow for mounting of the magnetic gear 102 or to receive input from a drivetrain of a motor (not shown). Additionally, bearings may be used to further facilitate the rotation of the magnetic gear 102.

As shown in FIG. 3, the magnetic gear 102 comprises a first body 302 and a second body 304. Each of the first body 302 and the second body 304 are preferred to be substantially identical to one another. In some embodiments, there may be some desired differences, but the overall principles must remain the same in order to accurately maintain about the 40:60 configuration as described in relation to FIG. 1. For example, there may be one a first body 302 and no second body 304 as part of the magnetic gear 102. Additionally, the gear may take various forms and have portions removed (e.g. forming a wheel with spokes) to reduce weight and modify other variables within the system. Virtually any shape and configuration of the gear(s) may be used within the purview of the present application as along as those principles otherwise discussed herein are met.

The plurality of magnets 104 are disposed between the first body 302 and the second body 304. There may be slots (see FIG. 4) to receive each of the plurality of magnets 104. Such slots may be recesses on each of the first body 302, the second body 304, or a combination thereof. The slots may allow for more than one magnet to be positioned within each slot or for magnets to be interchanged or removed to modify the functionality of the magnetic gear 102. Once the magnets have been positioned, securement mechanisms 306 may be utilized to join the first body 302 and the second body 304 thereby forming the gear body 106. Once assembled, the gear body 106 may be used in an array as will be further described herein.

As previously described, the plurality of magnets 104 are preferably rare earth magnets such as neodymium or samarium cobalt magnets or permanent magnets such as composite magnets, nano-structured magnets, electromagnets, and single-molecule magnets.

In other embodiments, electromagnets may be employed in such an embodiment.

Figure 4:
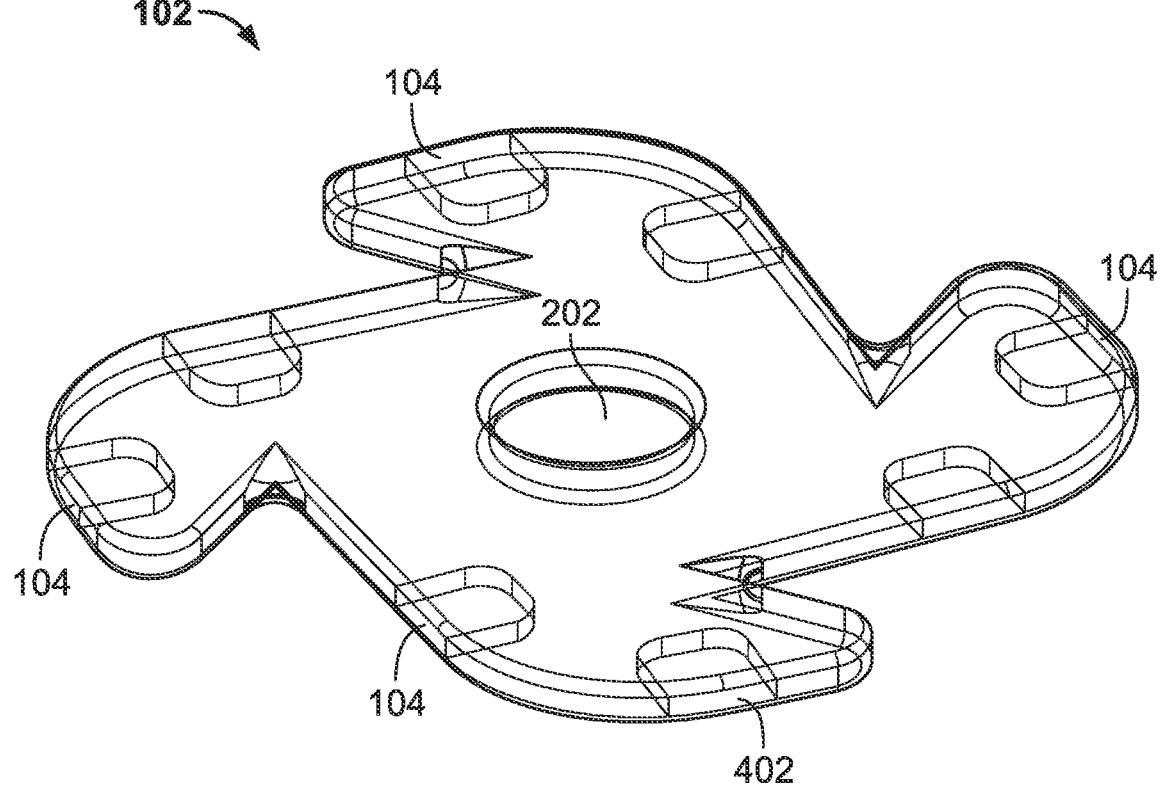
FIG. 4 illustrates a fourth embodiment of a magnetic gear in accordance with the present application.

FIG. 4 illustrates yet another embodiment of the present application. Here, the magnetic gear 102 is shown with various slots or hollows 402. Each of the hollows 402 can be tilted, rotated, and turned in any of the x, y, and/or z directions to any angle (from 0°-360°) to help aid magnetic coupling between multiple magnetic gears 102 in any the alignments of the gears as described herein. This is preferably done by making changes to any of the individual hollows 402 for the plurality of magnets 104 and not the outer visible structure of the gear body 106. This, in turn, allows for specific design adjustments for different applications, as also shown with the embodiment in FIG. 3, without the need for a complete magnetic gear 102 redesign.

Figure 5:
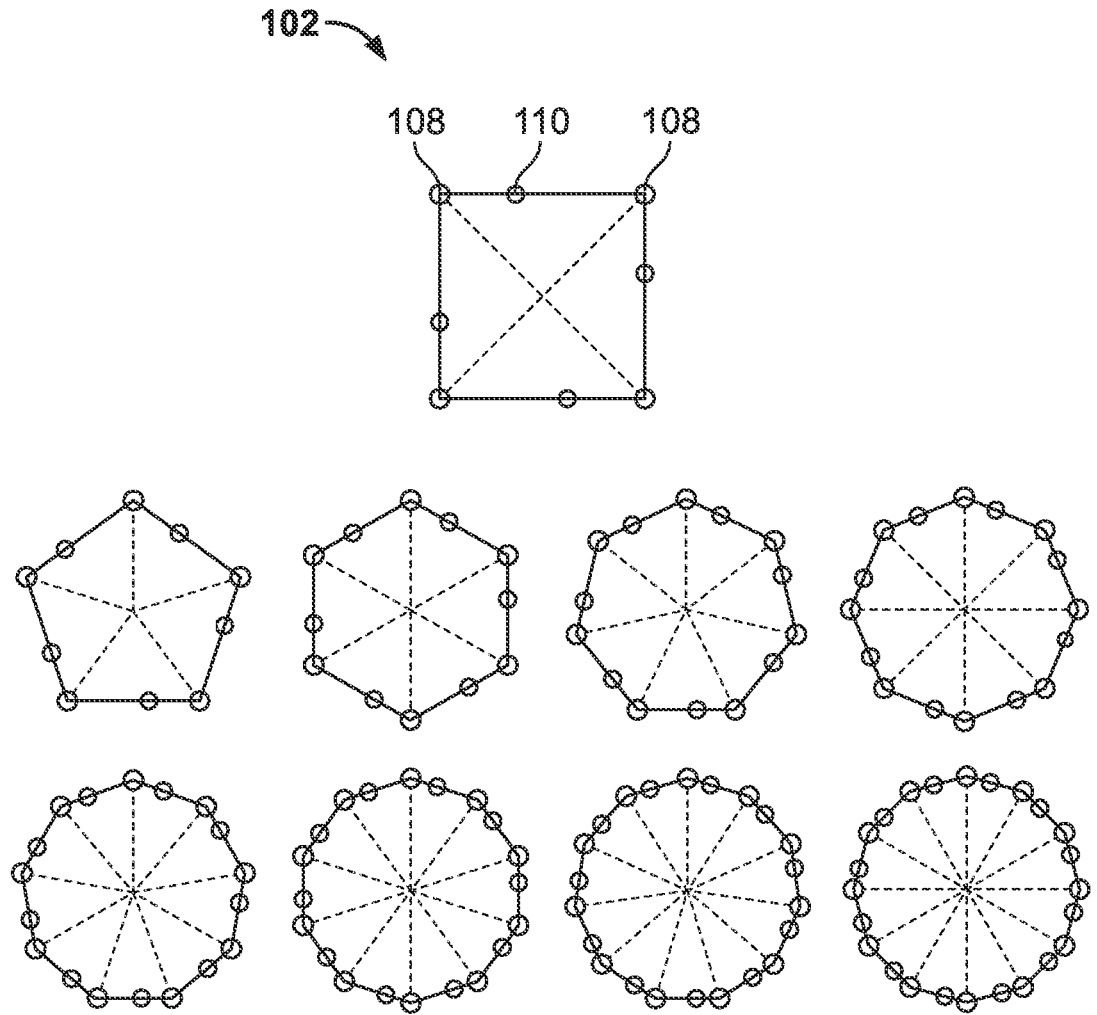
FIG. 5 illustrates the positioning of magnets upon magnetic gears having exemplary shapes.

As previously described herein and as shown in FIG. 5, the magnetic gears 102 of the present application may take on varying form factors. It is preferable that the magnetic gears 102 take on polygonal shapes, but irregular shapes may also be utilized under the purview of the present application. Shown here are exemplary magnetic gears 102, magnets having a positive polarity 108, and magnets having a negative polarity 110. The magnetic gears 102 shown herein are polygonal and have a number of sides varying from four to twelve sides. However, an embodiment of the present magnetic gears 102 may have more or fewer sides and preferably ranges from at least three sides to at least twenty sides.

Figure 6:
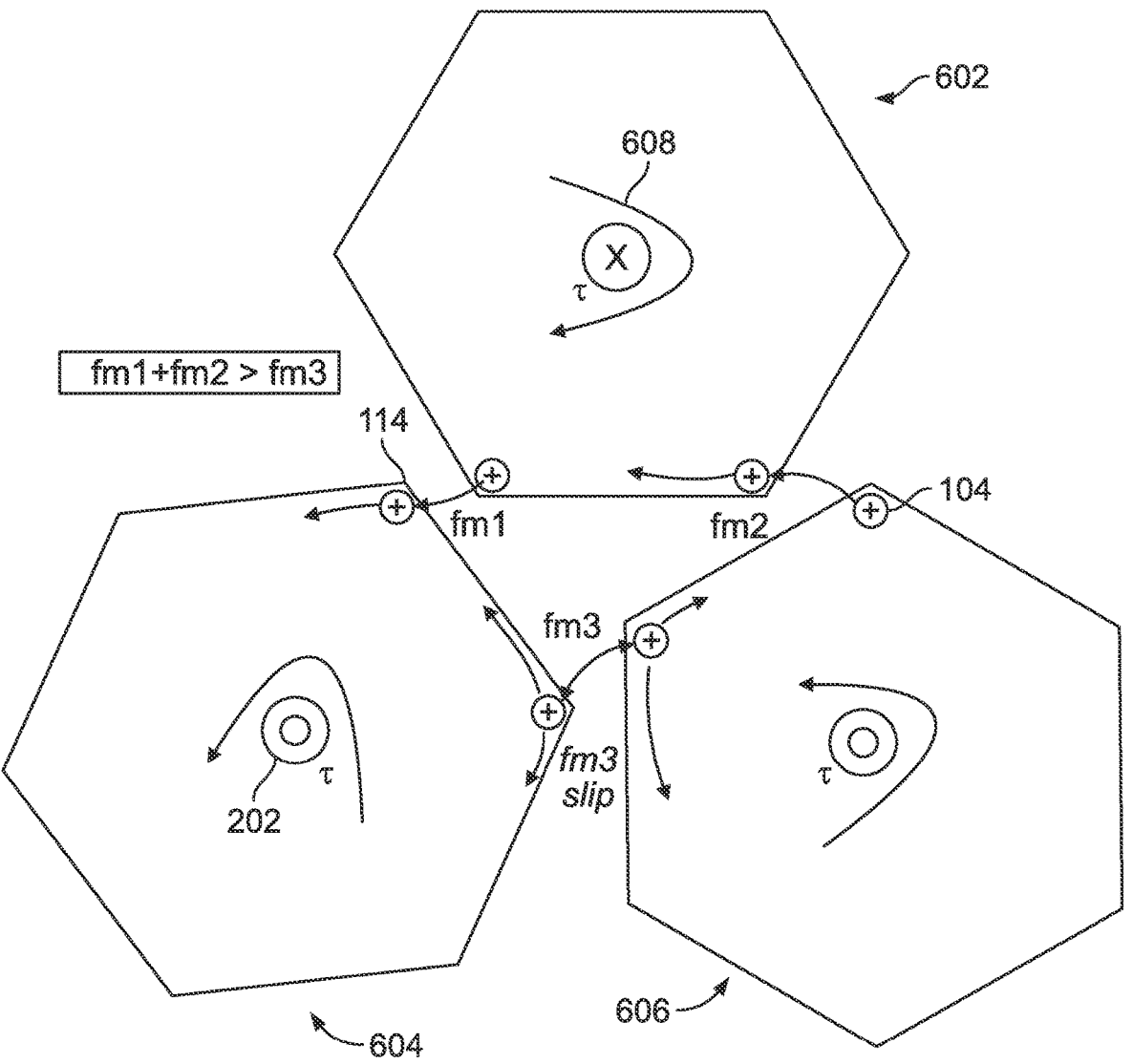
FIG. 6 is a diagram illustrating a magnetic slipping alignment of an embodiment of the present application.

Referring now to FIG. 6, shown are three magnetic gears configured in a triangular alignment. Shown is the triangular gear alignment having a plurality of magnets 104, a vertex 114 or vertices 114, a central aperture 202, a first magnetic gear 602, a second magnetic gear 604, a third magnetic gear 606, and a direction of rotation 608. The three gears can spin in unison in a triangular alignment without contact using magnetic coupling, which is not possible with mechanical gears that require contact. Torque transfers from the magnetic gear that is attached to a motor to the other two gears in the magnetic gear system.

In order to achieve this torque transfer, there is to be a magnetic "2:1 slipping" between the two gears moving with the same angular momentum or direction of rotation 608 and the third spinning magnetic gear having an opposing direction of rotation 608. When accomplished the FM1 and FM2 is greater than the FM3 as indicated which causes the slipping thereby allowing the like polarity magnets to move past each other without a loss of torque.

This triangular pattern can be repeated "n" number of times, creating multiple magnetic slips, without affecting RPM and torque transfer. One implementation of such a practical usage of this type of arrangement is a regenerative motor, containing at least two output motors, a drive shaft, and multiple generators where "n" number of gears can be added in sequence through magnetic coupling (in any alignment).

Figure 7:
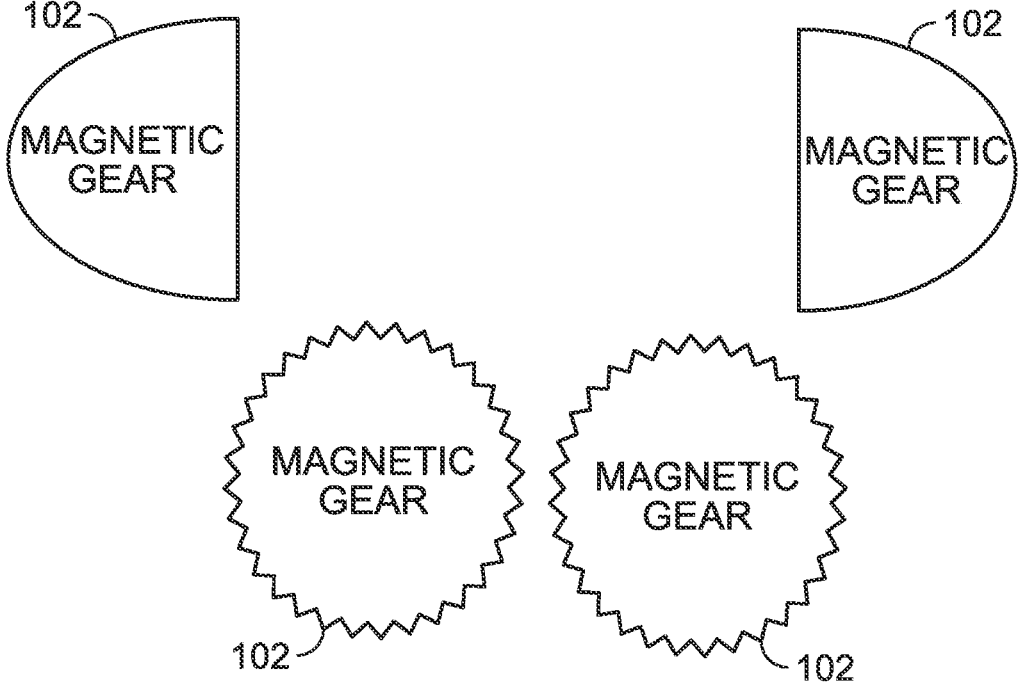
FIG. 7 illustrates an embodiment of an exemplary magnetic array.

Referring now generally to FIGS. 7 and 8, the magnetic gears 102 of the present application take advantage of the ability to form a magnetic array using a specific spacing of the plurality of magnets 104 around the periphery 112 of the gear body 106. The magnetic arrays of the present application can be applied to any geometric shape (including three-dimensional shapes) as long as spacing, and scaling is maintained. One gear can rotate another gear without contact using magnetic coupling (both repulsion and attraction) as described herein. Torque transfers from one magnetic gear 102 attached to a motor (not shown) to a second magnetic gear 102. The two gears can be aligned in multiple gear-orientations without contact using magnetic coupling. Said gear-orientations may include but are not limited to parallel axis, intersecting axis, nonparallel nonintersecting axis, and linear rack alignment. Each gear-orientation may be achieved without changing the magnet array pattern or gear design.

In the magnetic gear arrays, such as a first magnetic array 702 or the second magnetic array 802 as shown, a transfer of torque applied to the magnetic gear 102 operably coupled to the motor, which then, by the work of magnetic fields, and no physical contact, transfers the torque to another magnetic gear 102 through multiple axial orientation arrangements.

As shown in FIG. 7, there is a first magnetic array 702 comprised of multiple magnetic gears 102 of varying orientations. One of the magnetic gears 102 is to be driven by a motor (not shown) and the other magnetic gears 102 are oriented and spaced such that the motor-driven magnetic gear 102 can rotate a second magnetic gear 102 without touching it. The same trend continues for the other gears in the array.

As shown in FIG. 8, there is a second magnetic array 802 that has the magnetic gears 102 stacked in a Z-axis without contacting any of the respective magnetic gears 102 in the array. By using magnetic coupling and acting as one large gear along a center shaft, this allows the second magnetic array 802 to increase magnetic pull/push force.

By aligning the magnetic gears 102 vertically along the central axis, and by way of magnetic coupling, the like-poles (positive/positive and/or negative/negative) will attract, creating a uniform motion in a specific direction. This is referred to herein as "stacking." Each individual magnetic gear 102 added to the second magnetic array 802, in vertical, will all function as one gear moving in unison. Further, this "stacking" principle can be used with different sized magnetic gears 102 as long as the scaling is consistent. This allows for the magnetic gears 102 to be stacked in a custom order of size to allow maximum utility.

In general, any of the magnetic gears 102 described herein can be scaled to any symmetrical size in the X and Y plane, as long as the ratio of the parts and array spacing remains the same. Additionally, a thickness of the magnetic gears 102 can be increased as desired along the Z axis to create a longer, cylindrical-like frame. This is a specific feature that compounds the application of the wheel for larger loads but does not affect the integrity of the array in and of itself. In other embodiments, by extending the gear along the Z axis may create a sphere-like array comprising more than one similarly or differently shaped gear.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A magnetic gear comprising:
a first plurality of magnets including first magnets and second magnets;
a magnet retaining structure having a body with a periphery and more than one vertices,
wherein the magnet retaining structure is configured to secure a position of each of the plurality of magnets relative to the magnet retaining structure,
wherein one first magnet of the first magnets is positioned between two respective adjacent vertices of the body,
wherein one second magnet of the second magnets is located at each vertex of the two respective adjacent vertices, and
wherein the one first magnet, located between the second magnets at the two respective adjacent vertices is biased toward one vertex of the two respective adjacent vertices.

2. The magnetic gear of claim 1 further comprising a central aperture located in the body.

3. The magnetic gear of claim 1 wherein the body has at least three vertices, and there is one magnet second magnet of the second magnets located at each of the at least three vertices.

4. The magnetic gear of claim 1 wherein the body comprises a first body and a second body.

5. The magnetic gear of claim 1 wherein the plurality of magnets are configured to reside between the first body and the second body.

6. The magnetic gear of claim 1 wherein the plurality of magnets are arranged such that an N polarity of one of the plurality of magnets is adjacent to an S polarity of another of the plurality of magnets.

7. The magnetic gear of claim 3 wherein the body has four to twenty vertices, and there is one second magnet of the second magnets located at each vertex present in the body.

8. The magnetic gear of claim 1 wherein the magnet located between the two respective adjacent vertices is biased toward one vertex of the two respective adjacent vertices at a distance ratio of 40:60.

9. A magnetic gear comprising:
a plurality of magnets;
a magnet retaining structure configured to secure a position of each of the plurality of magnets between a first body and a second body,
wherein the first body and the second body have a substantially identical periphery and are configured to be secured to one another,
wherein the plurality of magnets are disposed along a periphery of the first body with a polarity of each magnet being of an opposing polarity in relation to the magnet on either side of the magnet,
wherein a magnet of the plurality of magnets is positioned at each vertex of the periphery and one magnet of the plurality of magnets is positioned between the magnet located at each vertex, and
wherein the one magnet located between the magnet located at each vertex splits a distance between two vertices in a 40:60 split.

10. The magnetic gear of claim 9 wherein the magnetic gear is a quadrilateral.

11. The magnetic gear of claim 10 wherein the quadrilateral is a square.

12. The magnetic gear of claim 9 wherein the magnetic gear is a hexagon.

13. The magnetic gear of claim 12 wherein the hexagon-shaped magnetic gear contains twelve magnets.

14. The magnetic gear of claim 9 wherein more than one magnet is located at a position on the magnetic gear.

15. The magnetic gear of claim 9 further comprising a plurality of securement mechanisms configured to secure the first body to the second body.

16. A magnetic gear system comprising:
a first magnetic gear comprising:
a first plurality of magnets including first magnets and second magnets;
a magnet retaining structure having a body with a periphery and more than one vertices,
wherein the magnetic retaining structure is configured to secure a position of each of the plurality of magnets relative to the magnet retaining structure,
wherein one first magnet of the first magnets is positioned between two respective adjacent vertices of the body,
wherein one second magnet of the second magnets is located at each vertex of the two respective adjacent vertices, and
wherein the one first magnet, located between the second magnets at the two respective adjacent vertices is biased toward one vertex of the two respective adjacent vertices; and
a second magnetic gear comprising:
a second plurality of magnets including third magnets and fourth magnets;
a magnet retaining structure having a body with a periphery and more than one vertices,
wherein the magnet retaining structure is configured to secure a position of each of the plurality of magnets relative to the magnet retaining structure,
wherein one third magnet of the third magnets is positioned between two respective adjacent vertices of the body, wherein one fourth magnet of the fourth magnets is located at each vertex of the two respective adjacent vertices, and wherein the one third magnet, located between the fourth magnets located at the two respective adjacent vertices is biased toward one vertex of the two respective adjacent vertices.

17. The magnetic gear system of claim 16 further comprising a third magnetic gear comprising:

a third plurality of magnets including fifth magnets and sixth magnets;

a magnet retaining structure having a body with a periphery and more than one vertex, wherein the magnet retaining structure is configured to secure a position of each of the plurality of magnets relative to the magnet retaining structure, wherein one fifth magnet of the fifth magnets is positioned between two respective adjacent vertices of the body, wherein one sixth magnet of the sixth magnets is located at each vertex of the two respective adjacent vertices, and wherein one fifth magnet, located between the sixth magnets at the two respective adjacent vertices is biased toward one vertex of the two respective adjacent vertices.

\*    \*    \*    \*    \*